United States Patent [19]
Youn

[11] Patent Number: 5,640,076
[45] Date of Patent: Jun. 17, 1997

[54] DEVICE AND A METHOD FOR CHARGING A BATTERY TO INPUT A DIRECT OR AN ALTERNATING CURRENT

[75] Inventor: Kil Young Youn, Seoul, Rep. of Korea

[73] Assignee: Hyundai Motor Company, Rep. of Korea

[21] Appl. No.: 350,617

[22] Filed: Dec. 7, 1994

[30] Foreign Application Priority Data

Dec. 7, 1993 [KR] Rep. of Korea .................. 93-26691

[51] Int. Cl.$^6$ ............................................. H02J 7/04
[52] U.S. Cl. .................................... 320/2; 320/56
[58] Field of Search ........................... 320/2, 12, 27, 320/29, 49, 56, DIG. 1; 363/142

[56] References Cited

U.S. PATENT DOCUMENTS

| | | | |
|---|---|---|---|
| 5,237,140 | 8/1993 | Akazawa et al. | 363/15 X |
| 5,287,053 | 2/1994 | Hutchinson | 320/2 |
| 5,420,496 | 5/1995 | Ishikawa | 320/56 |
| 5,506,490 | 4/1996 | DeMuro | 320/56 X |

FOREIGN PATENT DOCUMENTS 406335177  12/1994  Japan ........................ 320/56

*Primary Examiner*—Edward Tso
*Attorney, Agent, or Firm*—Finnegan, Henderson, Farabow, Garrett & Dunner, L.L.P.

[57] ABSTRACT

A device for charging a battery with one of a direct current and an alternating current includes a power adapter for providing a power signal and a power signal determining unit. The power signal determining unit determines whether the power signal is an alternating current or a direct current and a power transmission route selector selects a first power transmission route for the direct current and a second power transmission route for the alternating current. A charger receives the power signal to charge the battery. A power selecting unit includes a unit for transmitting the power signal from the power adapter to the battery through the charger when the first power transmission route for the alternating current signal is selected. A unit for transmitting the power signal from the power adapter to the battery when the second power transmission route for the direct current signal is selected.

15 Claims, 6 Drawing Sheets

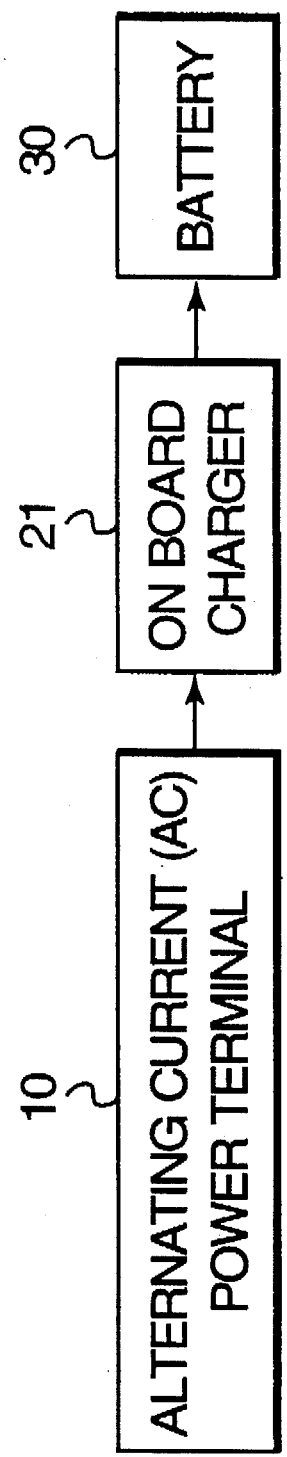
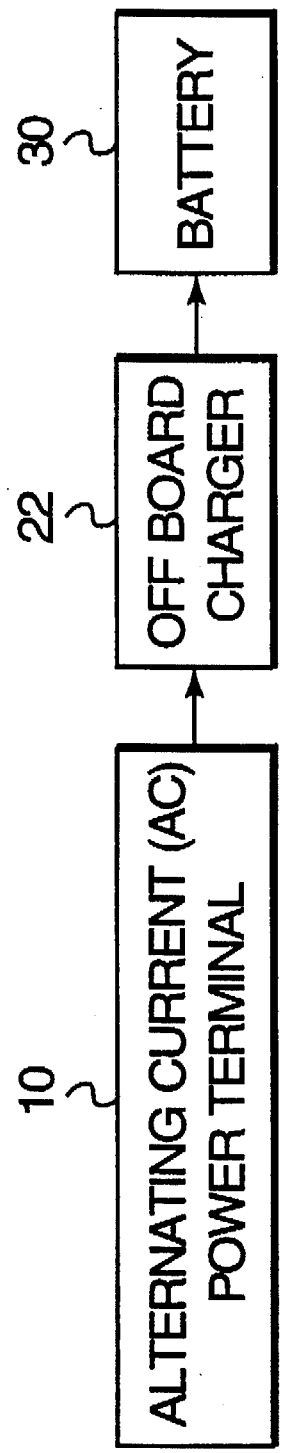

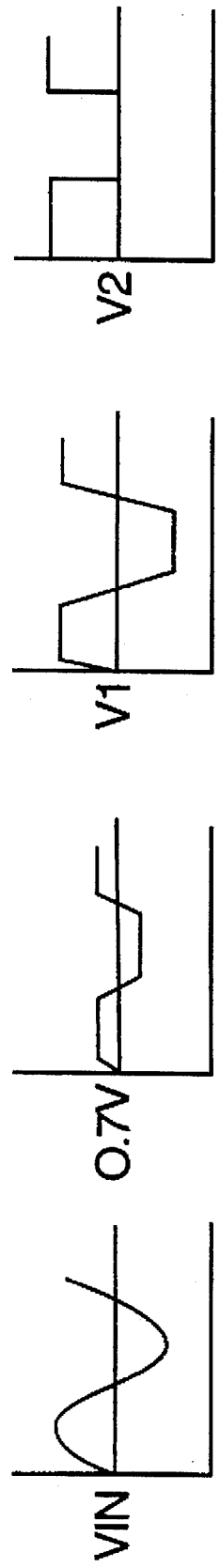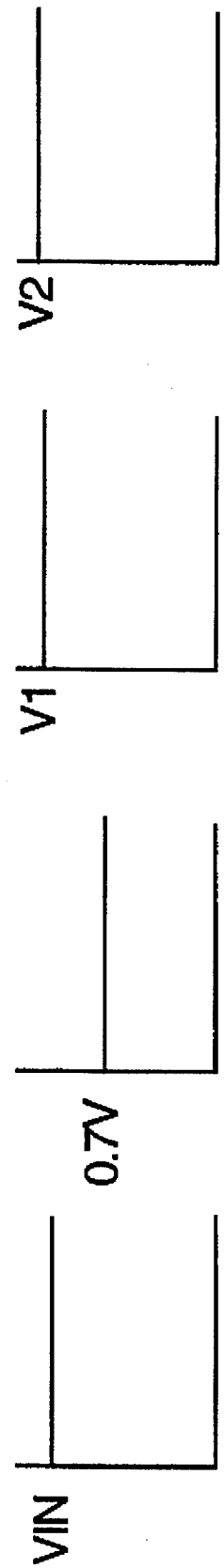

5,640,076

DEVICE AND A METHOD FOR CHARGING A BATTERY TO INPUT A DIRECT OR AN ALTERNATING CURRENT

FIELD OF THE INVENTION

The present invention relates to a device and a method for charging a battery for an automotive vehicle. More particularly, the present invention relates to a device and a method for charging an automotive battery from either a direct current or an alternating current source.

DISCUSSION OF THE RELATED ART

FIGS. 1A and 1B illustrate conventional charging arrangements using a charger installed on-board the automobile and an off-board charger, respectively. As shown in FIG. 1A, in a conventional charging device, alternating current (AC) power is applied through an AC power terminal 10 to a battery 30 via the on-board charger 21. A conventional charging device using an off-board charger is shown in FIG. 1B; using it, AC power is applied through an AC power terminal 10 to a battery 30 via the off-board charger 22.

Generally, an electric automotive vehicle has an on-board charger and a battery. There are two methods to charge a battery in an electric automotive vehicle.

According to a first method, AC power, e.g., normal home power, is applied to the on-board charger 21 mounted in the automotive vehicle through an AC power terminal, as shown in FIG. 1A. The AC power is then converted to direct current (DC) power by the on-board charger 21, thereby generating a charging current. Hence, the charging current generated from the on-board charger 21 is applied to the battery 30.

The second method does not use the on-board charger 21 equipped in the automotive vehicle. According to the second method, the AC power is applied to the off-board charger 22 through the AC power terminal 10 at a power charging station having the off-board charger 22. Then, the AC power is converted to the DC power by the off-board charger 22, thereby generating the charging current. Hence, the direct charging current generated from off-board charger 22 is applied to the battery 30.

The off-board charger 22 is capable of charging quickly, as compared to the on-board charger 21. Accordingly, for a conventional electric automotive vehicle, off-board charger 22 directly charges the battery 30 at the power charging station to save time, for example. Of course, on-board charger 21 in the automotive vehicle can also charge the battery 30. However, the on-board charger 21 in the conventional dualistic method for charging a battery of the electric automotive vehicle requires a long time to charge the battery.

When using off-board charger 22, a connector between the on-board charger 21 and the battery 30 in the automotive vehicle must be removed or installed for charging. Thus, there is a risk of receiving an electric shock and the inconvenience of removing and installing the connector each time a charge is required.

SUMMARY OF THE INVENTION

Accordingly, the present invention is directed to a device and method for charging a battery that substantially obviates one or more of the problems due to limitations and disadvantages of the prior art.

An advantage of the present invention is the provision of a device and a method for charging a battery to input a direct current or an alternating current in which a power signal determining portion determines whether a power signal inputted for charging is an alternating current or a direct charging current passing through an off-board charger of a power charging station to apply the power signal directly to a battery for the direct charging current and to apply the power signal to the battery through a charger for the alternating charging current.

Another advantage of the present invention is the removal of a potential electric shock and the inconvenience of removing and installing a connecter each time when charging with the off-board charger in the power charging station.

To achieve these and other advantages, and in accordance with the purpose of the invention, a device for charging a battery to input a direct current or an alternating current, comprises a power adapter to provide an analog power signal; a power signal determining unit for converting the analog power signal from the power adapter to a digital signal, for checking a level of the digital signal converted from the analog signal, for determining the digital signal as the alternating current when the level of the signal changes and selecting a power route for the alternating current signal, and for determining the signal as the direct current when the level of the signal does not change and selecting a power route for the direct current signal; and a power selecting unit for transmitting the power signal inputted through the power adapter to the battery via a charger when the power route for the alternating current signal is selected in the power signal determining unit, and for transmitting directly the power signal inputted through the power adapter to the battery when the electric route for the direct current signal is selected in the power signal determining unit.

In another aspect, a method for charging a battery to input a direct current or an alternating current comprises the steps of performing a first interrupt routine to detect an occurrence of a first interrupt, when the first interrupt occurs at every half period of time of a digital signal converted from an analog signal of a power signal determining unit; performing a second interrupt routine to detect an occurrence of a second interrupt, when the second interrupt occurs every time the digital signal converted from the analog signal of the power signal determining unit changes from a low level to a high level; initializing an internal variable when the power signal is applied after determining whether the power signal is applied or not; checking the digital signal converted from the analog signal of the power signal determining unit every time the first interrupt routine is performed, and when the level of the digital signal converted from the analog signal is not changed and the second interrupt routine is not performed during a predetermined period of time, determining the power signal inputted to the power signal determining unit as the direct current and selecting a power route for the direct current; and checking the digital signal converted from the analog signal of the power signal determining unit every time the first interrupt routine is performed, and when the level of the digital signal converted from the analog signal changes, the second interrupt routine is performed, and a frequency of the digital signal converted from the analog signal is in an alternating current area, determining the power signal inputted to the power signal determining unit as the alternating current and selecting the power route for the alternating current.

BRIEF DESCRIPTION OF THE DRAWINGS

In the drawings,

FIG. 1A shows a charging device having an on-board charger in a conventional device;

FIG. 1B shows a charging device having an off-board charger in a conventional device;

FIGS. 4A, 4B, 4C, and 4D show a waveform at each part of the device for charging a battery to input an alternating current in accordance with the preferred embodiment of the present invention;

FIGS. 4E, 4F, 4G, and 4H show a waveform at each part of the device for charging a battery to input a direct current in accordance with the preferred embodiment of the present invention.

DETAILED DESCRIPTION OF THE PREFERRED EMBODIMENTS

Preferred embodiments of the present invention will be more fully described with reference to the accompanying drawings.

Figure 2:
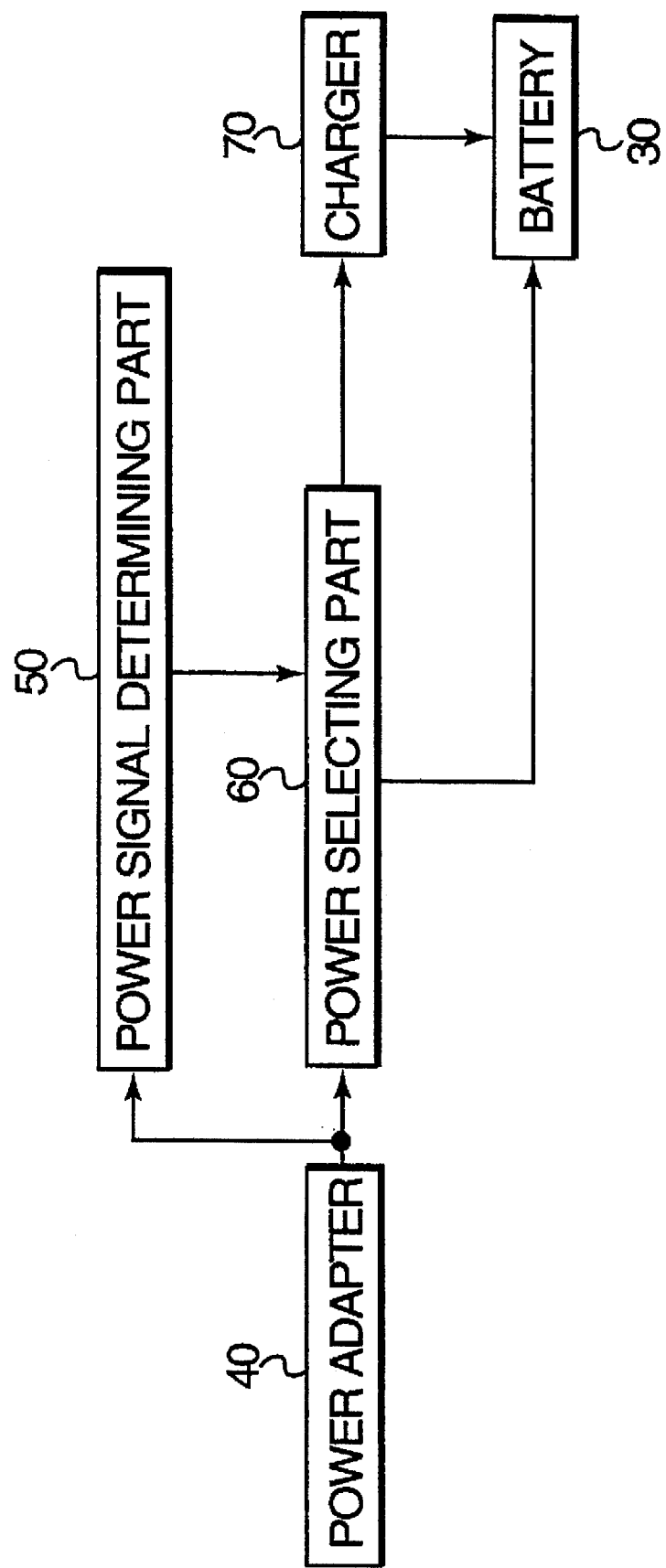
FIG. 2 is a block diagram of a device for charging a battery to input a direct current or an alternating current in accordance with a preferred embodiment of the present invention.
Figure 3:
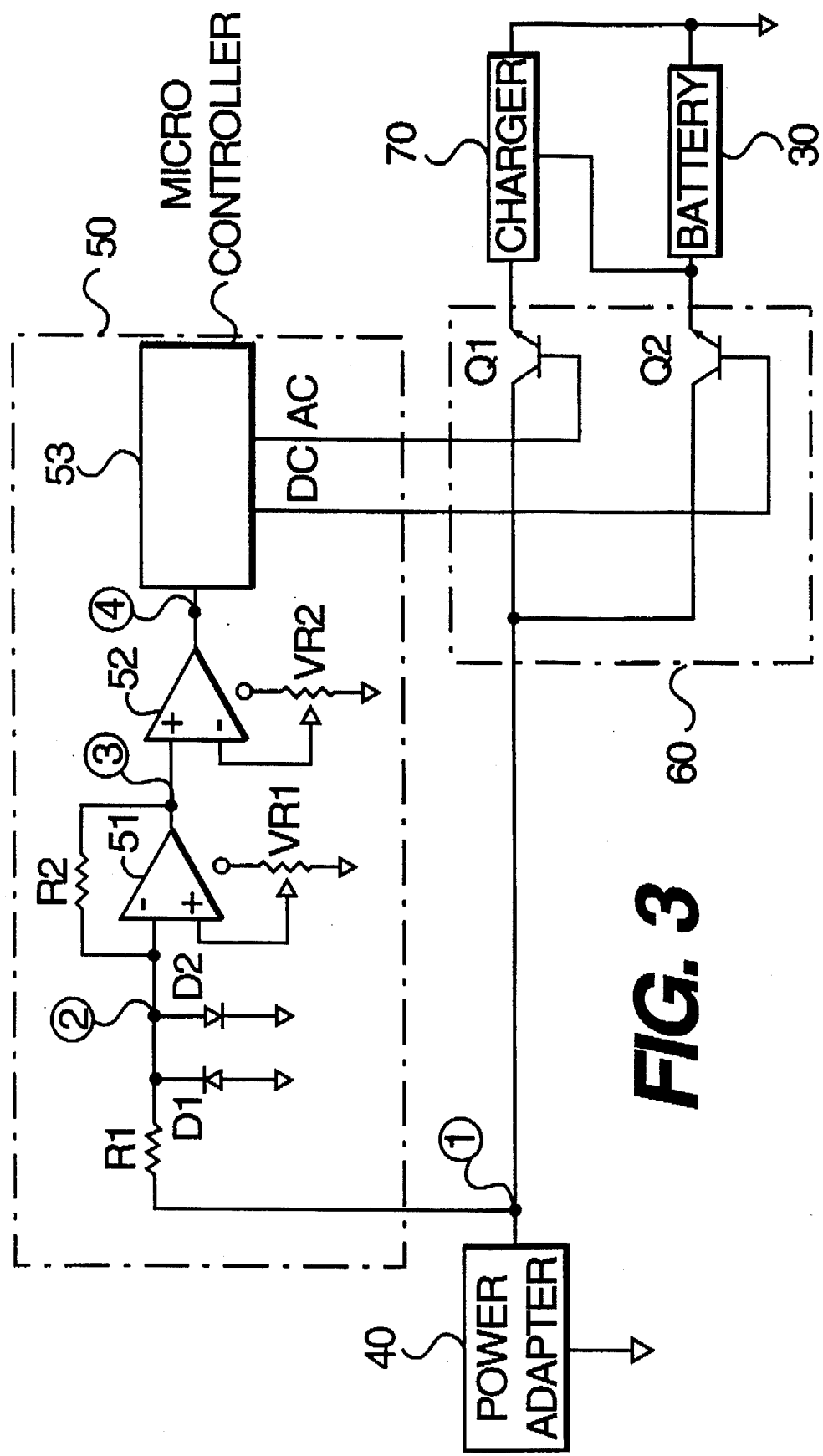
FIG. 3 is a detailed circuit diagram of the device for charging a battery to input a direct current or an alternating current in accordance with the preferred embodiment of the present invention.

Referring to FIGS. 2 and 3, the device for charging a battery to input a direct current or an alternating current in accordance with the preferred embodiment of the present invention includes a power adapter 40 to which an AC power terminal for home use or an off-board charger output terminal of a power charging station is connected. A power signal determining unit 50 is connected to an output terminal of the power adapter 40. As shown in FIG. 3, the output terminal of the power adapter 40 is connected to an inverting input terminal of an operational amplifier 51 of the power signal determining unit 50 through a resistor R1 and two diodes D1 and D2. A variable resistor VR1 is connected to a non-inverting input terminal of the operational amplifier 51 and a resistor R2 is connected to the inverting input terminal and the output terminal of the operational amplifier 51 in a feedback configuration. A variable resistor VR2 is connected to the inverting input terminal of the operational amplifier 52. The output terminal of the operational amplifier 51 is connected to the non-inverting input terminal of the operational amplifier 52. The output terminal of the operational amplifier 52 is connected to the input terminal of a microcontroller 53.

The battery charging device includes a power selecting unit 60 connected to the output terminal of the power adapter 40. In particular, the output terminal of the power adapter 40 is connected to collector terminals of two transistors Q1 and Q2 of the power selecting unit 60. An alternating current output terminal AC of the microcontroller 53 of the power signal determining unit 50 is connected to a base terminal of the transistor Q1 and a direct current output terminal DC of the microcontroller 53 is connected to a base terminal of the transistor Q2.

The battery charging device includes a charger 70 connected to an emitter terminal of the transistor Q1 of the power selecting unit 60 at its input terminal. An output terminal of the charger 70 is connected to an input terminal of a battery 30. The input terminal of the battery 30 is also connected to the emitter terminal of the transistor Q2 of the power selecting unit 60.

The following description explains the operation of the device and method for charging a battery to input a direct current or an alternating current in accordance with the preferred embodiment of the present invention.

First, DC or AC power such as for home use or a mass storage charger is connected to the power adapter 40 and the operation of the circuit is initiated. An output signal of the power adapter 40 is applied to the collector terminals of two transistor Q1 and Q2 of the power selecting unit 60 and to the resistor R1 of the power signal determining unit 50. In the above, the waveform of the output signal of the power adapter 40 is shown in FIG. 4A for an alternating current and the waveform of the output signal of the power adapter 40 is shown in FIG. 4E for a direct current.

The two diodes D1 and D2 the power signal determining unit 50 clamps the power signal applied through the resistor R1 and the resultant power signal is applied to the inverting input terminal of the operational amplifier 51. The clamped waveform is about 0.7 volt, which is the general threshold voltage of the diode. A clamped waveform of the AC power signal is shown in FIG. 4B and a clamped waveform of the DC power signal is shown in FIG. 4F.

The operational amplifier 51 and the resistor R2 or the variable resistor VR1 amplifiers the clamped signal from the two diodes D1 and D2. An amplified waveform of the AC power signal is shown in FIG. 4C and an amplified waveform of the DC power signal is shown in FIG. 4G.

The output signal of the operational amplifier 51 is applied to the non-inverting input terminal of the operational amplifier 52, which serves as a comparator. The operational amplifier 52 converts the applied signal from an analog to a digital signal. The variable resistor VR2 of the operational amplifier 52 determines a reference voltage for the operational amplifier 52. The converted digital waveform of the AC power signal is shown in FIG. 4D and a waveform converted from an analog waveform of the DC power signal is shown in FIG. 4F.

Figure 5A:
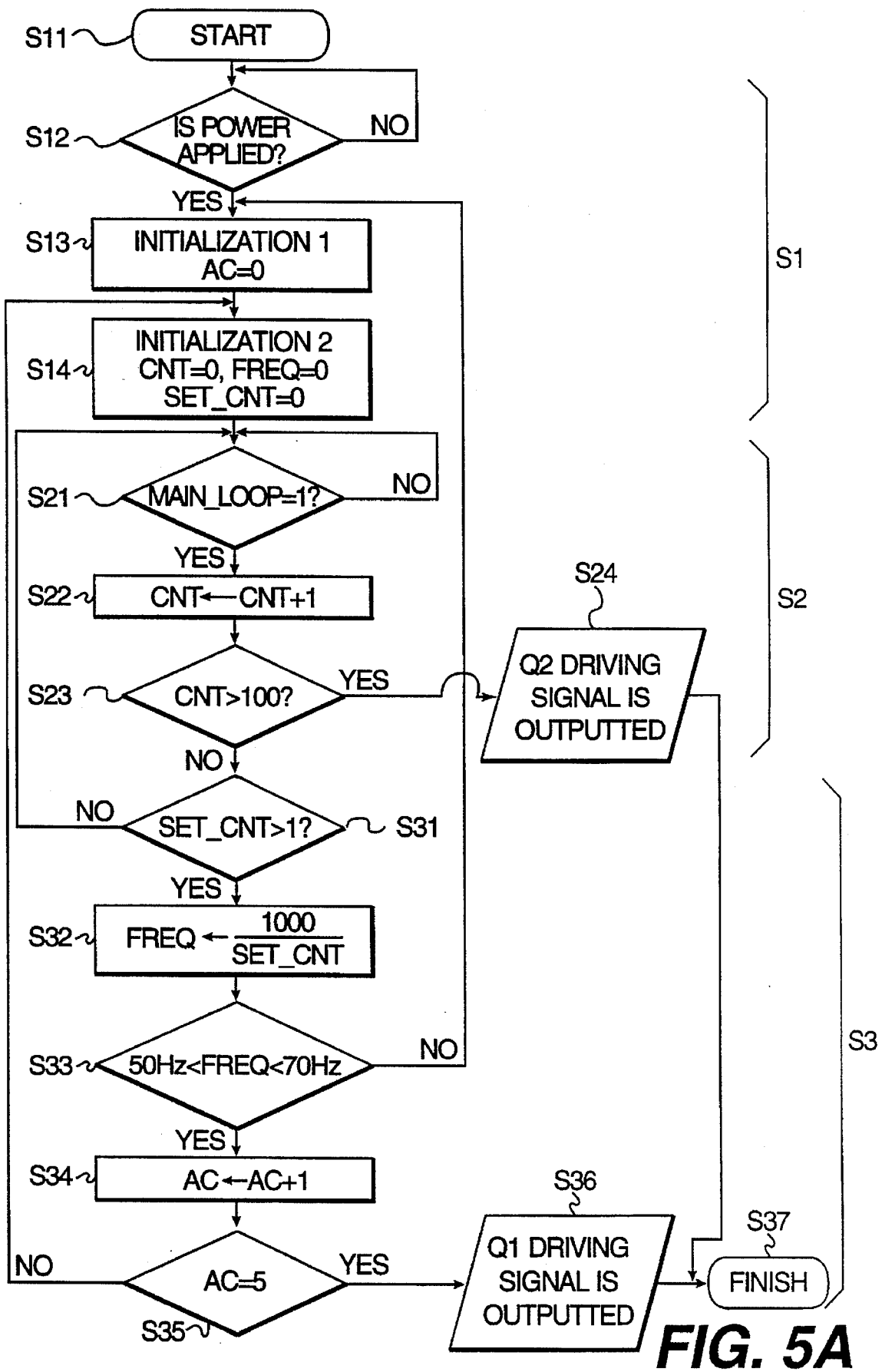
FIGS. 5A, 5B and 5C are flowcharts showing a method for charging a battery to input a direct current or an alternating current in accordance with the preferred embodiment of the present invention.
Figure 5B:
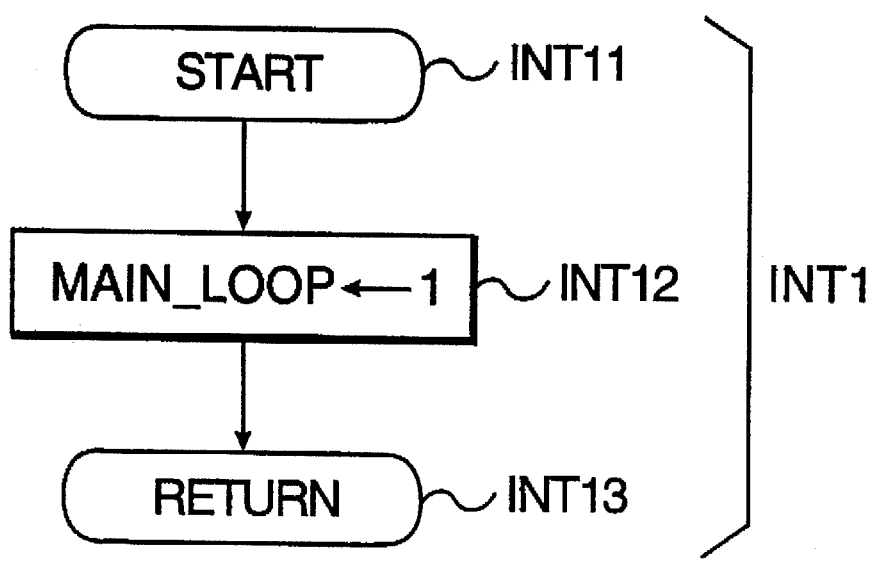
Figure 5C:
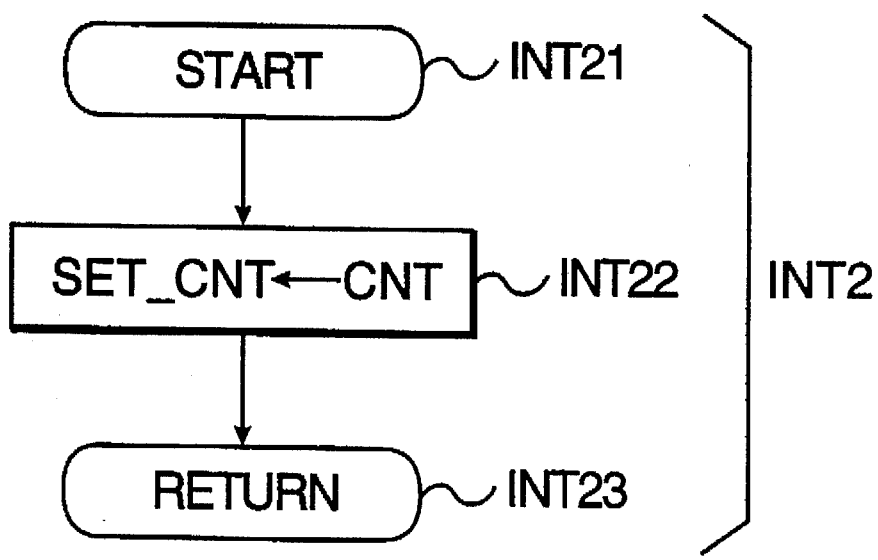

The digital signal converted from the analog signal in the operational amplifier 52 is applied to the microcontroller 53 and a program to determine DC and AC power signals is loaded in an internal memory of the microcontroller 53. As shown in FIGS. 5A–5C, the program to determine DC and AC power signals includes two interrupt routines INT1 and INT2 and main programs S1, S2 and S3. The following description concerns the interrupt routines.

The interrupt to initiate the first interrupt routine INT1 occurs whenever a 1 ms time period has elapsed using an internal timer of the microcontroller 53. Accordingly, the first interrupt routine INT1 starts its execution (INT11), as shown in FIG. 5B. When the first interrupt routine starts, an internal variable MAIN-LOOP of the program is set to 1 (INT12). Subsequently, the first interrupt routine returns to the main program (INT13).

The second interrupt routine INT2 determines the DC and AC power signal. The interrupt to initiate the second interrupt routine INT2 occurs whenever the output signal of the operational amplifier 52 applied to the microcontroller 53 changes from a low level to a high level. Accordingly, the second interrupt routine INT2 starts its execution (INT21), as shown in FIG. 5C. When the second interrupt routine INT2 starts, another internal variable SEC-CNT of the program receives a value of a variable CNT (INT22). Subsequently, the second interrupt routine returns to the main program (INT23).

When the main program starts (S11), the microcontroller 53 processes the output signal of the operational amplifier 52 (S12) and determines the state of the output signal. If the output signal of the operational amplifier 52 is not applied, however, the microcontroller 53 checks the output signal repeatedly until the output signal is applied. Once the output signal of the operational amplifier 52 is applied, an internal variable AC of the program is initialized to zero (S13). Other internal variables CNT, FREQ, and SET-CNT are also initialized to zero (S14).

After the completion of the initializing steps (S13 and S14), the microcontroller 53 checks whether the value of the variable MAIN-LOOP is equal to 1 or not (S21). Thus, the microcontroller 53 determines whether the first interrupt routine should be executed once a period of time of about 1 ms elapses measured by the internal timer of the microcontroller 53.

Accordingly, the first interrupt routine is executed. The main program continues its execution only after the first interrupt routine INT1 is completed.

Once the first interrupt routine iNT1 is performed and sets the value of the variable MAIN-LOOP to 1, the microcontroller 53 increments the value of the internal variable CNT by 1 (S22). When the value of the variable CNT is greater than 100, the microcontroller 53 determines that the output signal of the operational amplifier 52 is a direct current and outputs the driving signal to the transistor Q2 of the power selecting unit 60 (S24). Then, the program is complete (37).

When the microcontroller 53 determines that the value of the variable CNT is less than or equal to 100 (S23), the microcontroller 53 determines whether the value of the variable SET-CNT is greater than 1 (S31). If the value of the variable SET-CNT is not greater than 1, the routine is fed back to step S21 to repeatedly check whether the variable MAIN-LOOP is equal to 1.

If the signal applied from the operational amplifier 52 to microcontroller 53 is a DC signal, the second interrupt routine INT2 is not performed because the level of voltage has not changed. Therefore, the value of the variable SET-CNT is always zero. However, since the level of the voltage changes from a low level to a high level at every 16.7 ms when the signal applied from the operational amplifier 52 to microcontroller 53 is an AC signal of 60 Hz, the second interrupt routine INT2 is performed when the value of the variable CNT is about 16 or 17. Subsequently, the valve of the variable SET-CNT becomes 16 or 17 from the second interrupt routine INT2, such that the value of the variable SET-CNT is larger than 1.

When the microcontroller 53 determines that the value of the variable SET-CNT is larger than 1 (S31), the value of a variable FREQ is calculated (S32) by 1000/SET-CNT. When the value of the variable FREQ is between 50 to 70 Hz, the microcontroller 53 determines that the current is an alternating current (S33), and subsequently, the microcontroller 53 increments the value of the variable AC (S34). When the value of the FREQ is not greater than 50 Hz and not less than 70 Hz in step (S33), the program returns to the initializing step (S13).

The step for determining whether the value of the counter AC is over five (S35) is added to repeat the process five times in order to determine accurately the AC signal. When the value of the counter AC is equal to 5, the microcontroller 53 determines that the signal applied from the operational amplifier 52 to the microcontroller 53 is an AC signal. Thus, the driving signal is output (S36) to the transistor Q1 of the power selecting unit 60. Then, the program is complete.

When the microcontroller 53 determines that the power signal is a DC signal in the power signal determining unit 50 and the driving signal of the transistor Q2 of the power selecting unit 60 is output, as discussed above, the transistor Q2 is turned on. Thus, the DC power signal applied to the power adapter 40 is directly applied to the battery 30. However, when the microcontroller 53 determines that the power signal is an AC signal in the power signal determining unit 50 and the driving signal of the transistor Q1 is output, the transistor Q1 is turned on. Thus, the AC power signal applied to the power adapter 40 is applied to the battery 30 through the charger 70 in the automotive vehicle.

Charging the automotive vehicle battery 30 is completed by applying the DC and AC power signal from the power adapter 40 to the battery 30. AC power signal is applied to the battery 30 via the charger 70.

Accordingly, in the preferred embodiment of the present invention, a microcontroller checks whether a power signal applied to a power adapter is a direct current or an alternating current. If the power signal is a direct current signal, the power signal is directly applied to the battery. If the power signal is an alternating current signal, however, the power signal is applied to the battery through a charger. Therefore, the route for applying power for either direct or alternating current is unified to improve the safety for a person charging a battery.

It will be apparent to those skilled in the art that various modifications and variations can be made in the device and method for charging a battery of the present invention without departing from the spirit or scope of the invention. Thus, it is intended that the present invention cover the modifications and variations of this invention provided they come within the scope of the appended claims and their equivalents.

What is claimed is:

1. A device for charging a battery with one of a direct current and an alternating current comprises:
  a power adapter for providing a power signal;
  a power signal determining unit including:
    means for converting the power signal from the power adapter to a digital signal;
    means for checking a level of the digital signal converted from the power signal;
    means for determining the digital signal as an alternating current signal when the level of the digital signal changes and for selecting a first power transmission route for the alternating current signal; and
    means for determining the digital signal as a direct current signal when the level of the digital signal does not change and for selecting a second power transmission route for the direct current signal;
  a charger for receiving the power signal to charge the battery; and
  a power selecting unit including:
    means for transmitting the power signal from the power adapter to the battery through the charger when the first power transmission route for the alternating current signal is selected in the power signal determining unit; and
    means for transmitting the power signal from the power adapter to the battery when the second power transmission route for the direct current signal is selected in the power signal determining unit.

2. The device according to claim 1, wherein said power signal determining unit further includes:
  means for clamping the power signal applied to the power adapter;

a first operational amplifier for amplifying an output signal of the clamping means;

a second operational amplifier for converting an output signal of the first operational amplifier to the digital signal; and a microcontroller for determining whether the digital signal is one of the direct current signal and the alternating current signal.

3. The device according to claim 2, wherein said second operational amplifier is a comparator.

4. The device according to claim 2, wherein the power signal determining unit further includes a resistor connected to the first operational amplifier for receiving the power signal output from the power adapter.

5. The device according to claim 2, wherein the power signal determining unit further includes a variable resistor connected to a non-inverting input of the first operational amplifier; and a resistor connected to the inverting input and an output of the first amplifier in a feedback configuration.

6. The device according to claim 2, wherein the power signal determining unit further includes a variable resistor connected to an inverting input of the second operational amplifier.

7. The device according to claim 1, wherein said power selecting unit further includes:

a first transistor for transmitting the alternating current signal from the power adapter to the charger; and a second transistor for transmitting the direct current signal from the power adapter to the battery.

8. The device according to claim 7, wherein the direct current signal from the power adapter is transmitted directed to the battery.

9. A device for charging a battery comprises:

a power adapter for providing a power signal;

a power signal determining unit for determining whether the power signal is one of an alternating current and a direct current;

means for selecting one of a first power transmission route for the direct current and a second power transmission route for the alternating current;

a charger for receiving the power signal to charge the battery; and a power selecting unit including:

means for transmitting the power signal from the power adapter to the battery through the charger when the first power transmission route for the alternating current signal is selected in the selecting means; and means for transmitting the power signal from the power adapter to the battery when the second power transmission route for the direct current signal is selected in the selecting means.

10. A method for charging a battery using a device including a power adapter and a power signal determining unit, the method comprising the steps of:

transmitting an analog power signal from the power adapter to the power signal determining unit;

converting the analog power signal to a digital power signal;

detecting an occurrence of a first interrupt at every predetermined period of the digital signal and executing a first interrupt operation;

detecting an occurrence of a second interrupt when the digital signal transitions from a first level to a second level and executing a second interrupt operation;

determining whether the power signal is applied to the power signal determining unit;

initializing an interval variable when the power signal is applied to the power signal determining unit;

checking the digital signal when the first interrupt operation is executed;

determining the power signal applied to the power signal determining unit as the direct current when the digital signal has no transition from the first level to the second level and the second interrupt operation is not performed during a set period of time;

selecting a power transmission route for the direct current and applying the direct current to the battery for charging;

determining the power signal applied to the power signal determining unit as the alternating current when the digital signal transition from the first level to the second level, the second interrupt operation is performed, and the digital signal has a frequency in a predetermined frequency range; and selecting a power transmission route for the alternating current and applying the alternating current to the battery for charging.

11. A method for charging a battery according to claim 10, wherein the first interrupt detecting step detects the occurrence of the first interrupt at every half period of the digital signal.

12. A method for charging a battery using a device including a power adapter and a charger, the method comprising the steps of:

providing a power signal;

determining whether the power signal is one of an alternating current and a direct current;

selecting one of a first power transmission route for the direct current and a second power transmission route for the alternating current;

transmitting the power signal from the power adapter to the battery through the charger when the first power transmission route for the alternating current signal is selected; and transmitting the power signal from the power adapter to the battery when the second power transmission route for the direct current signal is selected.

13. A method for charging a battery using a device including a power adapter and a charger, the method including the steps of:

providing a power signal;

converting the power signal to a digital signal;

checking a level of the digital signal converted from the power signal;

determining the digital signal as an alternating current signal when the level of the digital signal changes and selecting a first power transmission route for the alternating current signal; and determining the digital signal as a direct current signal when the level of the digital signal does not change and for selecting a second power transmission routE; for the direct current signal;

transmitting the power signal from the power adapter to the battery through the charger when the first power transmission route for the alternating current signal is selected; and transmitting the power signal from the power adapter to the battery when the second power transmission route for the direct current signal is selected.

14. A device for charging a battery comprising:

a power adapter for providing a power signal;

means for converting the power signal to a digital signal;

a power signal determining unit for determining whether the power signal is one of an alternating current and a direct current based on a level of the digital signal;

means for selecting one of a first power transmission route for the alternating current and a second power transmission route for the direct current;

a charger for receiving the power signal to charge the battery; and a power selecting unit including:

means responsive to selection of a first power transmission route for transmitting the power signal from the power adapter to the battery through the charger; and means responsive to selection of the second power transmission route for transmitting the power signal from the power adapter directly to the battery.

15. A method for charging a battery using a device including a power adapter and a charger, the method comprising the steps of:

providing a power signal;

converting the power signal to a digital signal;

determining whether the power signal is one of an alternating current and a direct current based on a level of the digital signal;

selecting one of a first power transmission route for the alternating current and a second power transmission route for the direct current;

transmitting the power signal from the power adapter to the battery through the charger when the first power transmission route for the alternating current signal is selected; and transmitting the power signal from the power adapter to the battery when the second power transmission route for the direct current signal is selected.

* * * * *